US008965694B2

(12) United States Patent
Daikoku

(10) Patent No.: US 8,965,694 B2
(45) Date of Patent: Feb. 24, 2015

(54) ROUTE SEARCH METHOD

(71) Applicant: Clarion Co., Ltd., Saitama-shi, Saitama (JP)

(72) Inventor: Kentaro Daikoku, Kawaguchi (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/352,249

(22) PCT Filed: Oct. 17, 2012

(86) PCT No.: PCT/JP2012/076852
§ 371 (c)(1),
(2) Date: Apr. 16, 2014

(87) PCT Pub. No.: WO2013/058285
PCT Pub. Date: Apr. 25, 2013

(65) Prior Publication Data
US 2014/0278103 A1    Sep. 18, 2014

(30) Foreign Application Priority Data
Oct. 17, 2011    (JP) .............................. 2011-2277625

(51) Int. Cl.
G01C 21/00    (2006.01)
G08G 1/123    (2006.01)
G01C 21/34    (2006.01)
G09B 29/10    (2006.01)

(52) U.S. Cl.
CPC ............ *G01C 21/34* (2013.01); *G01C 21/3469* (2013.01); *G09B 29/10* (2013.01)
USPC ..................................... 701/533; 340/995.19

(58) Field of Classification Search
USPC .................... 701/533, 400–541; 340/988–996
See application file for complete search history.

(56) References Cited

U.S. PATENT DOCUMENTS

| 7,822,029 | B2 * | 10/2010 | Brand et al. ................... 370/389 |
| 8,798,919 | B2 * | 8/2014 | Yano et al. .................... 701/428 |
| 2010/0114473 | A1 * | 5/2010 | Kono et al. .................... 701/200 |
| 2010/0138093 | A1 | 6/2010 | Oku et al. |

(Continued)

FOREIGN PATENT DOCUMENTS

| JP | 2010-101745 A | 5/2010 |
| JP | 2010-107459 A | 5/2010 |
| JP | 2013-140057 A | 7/2013 |

(Continued)

OTHER PUBLICATIONS

International Search Report dated Dec. 25, 2012 w/ English translation (two (2) pages).

*Primary Examiner* — Muhammad Shafi
(74) *Attorney, Agent, or Firm* — Crowell & Moring LLP

(57) ABSTRACT

A route search method includes: a step in which the computer generates a first network by, for each of nodes and each of links, generating a plurality of duplicates thereof; a step in which the computer generates a second network by adding first additional links to the first network; and a step in which the computer searches for a route from a duplicate of a node corresponding to the departure point to a duplicate of a node corresponding to the destination point, using the second network. The first additional links are links for which predetermined non negative link costs are set, and in each of which a node of an end point of a duplicate of each of the links is changed to a node of an end point of another duplicate of the each of the links.

12 Claims, 12 Drawing Sheets

(56) References Cited

U.S. PATENT DOCUMENTS

2011/0077854 A1* 3/2011 Fushiki et al. ............... 701/201
2013/0173084 A1 7/2013 Tagawa et al.

FOREIGN PATENT DOCUMENTS

| WO | WO 2008/133085 A1 | 11/2008 |
| WO | WO 2013/183764 A1 | 12/2013 |

* cited by examiner (a)

(b)

| ID OF LINK | ID OF START NODE | ID OF END NODE | LINK COST [Wh] |
|---|---|---|---|
| L1 | N1 | N2 | 20 |
| L2 | N2 | N3 | 10 |
| L3 | N1 | N4 | 60 |
| L4 | N2 | N5 | 30 |
| L5 | N3 | N6 | 10 |
| L6 | N4 | N5 | −20 |
| L7 | N5 | N6 | −10 |

ROUTE SEARCH METHOD

TECHNICAL FIELD

The present invention relates to a route search method.

BACKGROUND ART

With a vehicle that is equipped with a battery for propulsion, such as an electric automobile (EV) or a hybrid electric automobile (HEV) or the like, in order to manage the distance that can be driven in an appropriate manner, consideration must be given, not only to consumption of the battery power during traveling, but also to regeneration of the battery power. In Patent Literature #1, a route search device is described that performs route searching by calculating link costs for route searching based upon amounts of regenerated power.

Moreover, as a method of performing route searching based upon link costs, the use of Dijkstra's algorithm is per se known as a method for solving the single source shortest path problem.

CITATION LIST

Patent Literature

Patent Literature #1: Japanese Laid Open Patent Publication 2010-101745.

SUMMARY OF INVENTION

Technical Problem

In Patent Literature #1, even though the amount of regenerated power is included in the link cost, it cannot be said that consideration is given to the amount of electrical power consumption for each link. Due to this, the amount of electrical power consumption may become greater than the amount of regenerated power, and thus there is a concern that a route will be searched with which it becomes impossible to arrive at the destination point.

The object of the present invention is to make it possible to search a route while giving consideration both to consumption of battery power and also to power regeneration.

Solution to Technical Problem

According to the first aspect of the present invention, a route search method comprises: an extracting step in which a computer extracts, from map data including node data relating to nodes and link data relating to links, nodes and links included in a map area in which a departure point and a destination point are included; a link cost calculating step in which the computer calculates, for links extracted in the extracting step, non negative link costs related to energy consumption or non positive link costs related to energy regeneration; a first network generating step in which the computer generates a first road network by, for each of the nodes and each of the links extracted in the extracting step, generating a plurality of duplicates thereof; a second network generating step in which the computer generates a second road network by adding first additional links and second additional links to the first road network; and a route searching step in which the computer searches for a route from a duplicate of a node corresponding to the departure point to a duplicate of a node corresponding to the destination point, using the link costs calculated in the link cost calculating step and the second road network generated in the second network generating step. The first additional links are links for which predetermined non negative link costs are set, and in each of which a node of an end point of a duplicate of each of the links generated in the first network generating step is changed to a node of an end point of another duplicate of the each of the links. The second additional links are links for which predetermined non negative link costs are set, and each of which connects between duplicates of node corresponding to the destination point.

According to the second aspect of the present invention, a route search method comprises: an extracting step in which a computer extracts, from map data including node data relating to nodes and link data relating to links, nodes and links included in a map area in which a departure point and a destination point are included; a first network generating step in which the computer generates a first road network by, for each of the nodes and each of the links extracted in the extracting step, generating a plurality of duplicates thereof; a second network generating step in which the computer generates a second road network by adding first additional links and second additional links to the first road network; and a route searching step in which the computer searches for a route from a duplicate of a node corresponding to the departure point to a duplicate of a node corresponding to the destination point, using the second road network. Energy consumption or energy regeneration is included in the link data as a non negative link cost or a non positive link cost respectively. The first additional links are links for which predetermined non negative link costs are set, and in each of which a node of an end point of a duplicate of each of the links generated in the first network generating step is changed to a node of an end point of another duplicate of the each of the links. The second additional links are links for which predetermined non negative link costs are set, and each of which connects between duplicates of node corresponding to the destination point.

According to the third aspect of the present invention, in the route search method according to the first or the second aspect, it is preferred that, in the first network generating step, a plurality of duplicate graphs are generated, each containing nodes and links extracted in the extracting step and the first road network having a plurality of layers is generated using the plurality of duplicate graphs.

According to the fourth aspect of the present invention, in the route search method according to the third aspect, it is preferred that the first additional links are links in each of which the end point of the duplicate of the each of the links generated in the first network generating step is changed to the end point of the another duplicate of the each of the links belonging to a different layer only by layer number corresponding to the link cost; and the second additional links are links each of which, among duplicates of the node corresponding to the destination point, connects between duplicates of the node corresponding to the destination point whose layers are one layer apart.

According to the fifth aspect of the present invention, in the route search method according to the third or the fourth aspect, it is preferred that the map data includes elevation value information related to elevation of ground points on the road map; and total number of layers of the first road network is calculated based upon the elevation value information.

According to the sixth aspect of the present invention, a route search method comprises: an extracting step in which a computer extracts, from map data including node data relating to nodes and link data relating to links, nodes and links included in a map area in which a departure point and a destination point are included; a link cost calculating step in which the computer calculates, for links extracted in the extracting step, non negative link costs related to electrical power consumption or non positive link costs related to power regeneration and link costs related to fuel consumption; a first network generating step in which the computer generates a first road network by, for each of the nodes and each of the links extracted in the extracting step, generating a plurality of duplicates thereof; a second network generating step in which the computer generates a second road network by adding first additional links to the first road network; and a route searching step in which the computer searches for a route from a duplicate of a node corresponding to the departure point to a duplicate of a node corresponding to the destination point, using the link costs calculated in the link cost calculating step and the second road network generated in the second network generating step. The first additional links are links for which link costs related to amounts of electrical power consumption are set to predetermined non negative values, and in each of which a node of an end point of a duplicate of each of the links is changed to a node of an end point of another duplicate of the each of the links.

According to the seventh aspect of the present invention, a route search method comprises: an extracting step in which a computer extracts, from map data including node data relating to nodes and link data relating to links, nodes and links included in a map area in which a departure point and a destination point are included; a first network generating step in which the computer generates a first road network by, for each of the nodes and each of the links extracted in the extracting step, generating a plurality of duplicates thereof; a second network generating step in which the computer generates a second road network by adding first additional links to the first road network; and a route searching step in which the computer searches for a route from a duplicate of a node corresponding to the departure point to a duplicate of a node corresponding to the destination point, using the second road network generated in the second network generating step. A non negative link cost related to electrical power consumption or a non positive link cost related to electrical power regeneration and a link cost related to fuel consumption are included in the link data for each link. The first additional links are links for which predetermined non negative link costs are set, and in each of which a node of an end point of a duplicate of each of the links is changed to a node of an end point of another duplicate of the each of the links.

According to the eighth aspect of the present invention, in the route search method according to the sixth or the seventh aspect, it is preferred that, in the first network generating step, a plurality of duplicate graphs are generated, each containing nodes and links extracted in the extracting step and the first road network having a plurality of layers is generated using the plurality of duplicate graphs.

According to the ninth aspect of the present invention, in the route search method according to the eighth aspect, it is preferred that the first additional links are links in each of which the end point of the duplicate of the each of the links generated in the first network generating step is changed to the end point of the another duplicate of the each of the links belonging to a different layer only by layer number corresponding to a link cost related to the electrical power consumption or a link cost related to the electrical power regeneration.

Advantageous Effects of Invention

According to the present invention, it is possible to search a route while giving consideration both to consumption of battery power and also to power regeneration.

DESCRIPTION OF EMBODIMENTS

First Embodiment

Figure 1:
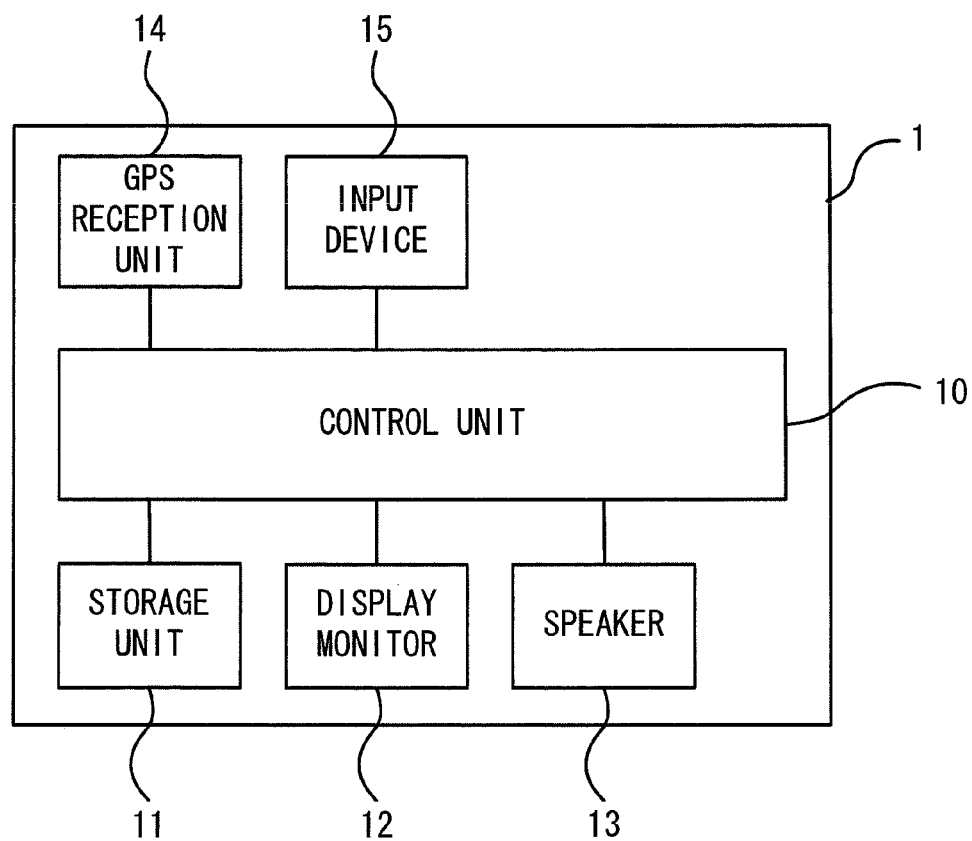
FIG. 1 is a block diagram showing an example of the structure of a route search device according to a first embodiment of the present invention.

FIG. 1 is a block diagram showing an example of the structure of a route search device according to the first embodiment of the present invention. The route search device shown in FIG. 1 is a navigation device, and is mounted to a vehicle such as an electric automobile or the like that is equipped with a battery for propulsion. The route search device 1 includes a control unit 10, a storage unit 11, a display monitor 12, a speaker 13, a GPS reception unit 14, and an input device 15.

The control unit 10 includes a microprocessor, peripheral circuitry of various types, RAM, ROM and so on. The control unit 10 controls the various structural portions of the route search device 1 so as to perform route search processing and so on as will be described hereinafter. In other words, the control unit 10 executes a program stored in its ROM while using its RAM as a working area, and thereby performs control of the route search device 1.

The storage unit 11 is a non volatile storage member such as a hard disk or a flash memory or the like. Map data, the mass of the electric vehicle to which the route search device 1 is mounted, and so on are stored in the storage unit 11. This map data includes node data and link data used by the control unit 10 in route search processing.

Node data is information related to nodes that specify predetermined ground points upon a road map. This node data includes the IDs of the nodes, position information for the ground points specified by the nodes, and elevation value information for the ground points specified by the nodes.

Link data is information related to links that specify roads upon the road map. This link data includes IDs of the links, IDs of the start nodes of the links, IDs of their end nodes, and costs of the links. The links specified by the link data are directed, and have nodes at their start points and at their end points. Moreover weightings, i.e. so called link costs, are set for the links specified by the link data. These link costs may, for example, be the amounts of battery power that are consumed when the electric automobile or the like travels along the roads that correspond to the links, or the like, and some of these link costs may be negative. A road map is expressed as a plurality of nodes included in the map data, and a weighted directed graph containing one or a plurality of links included in the map data.

Figure 2:
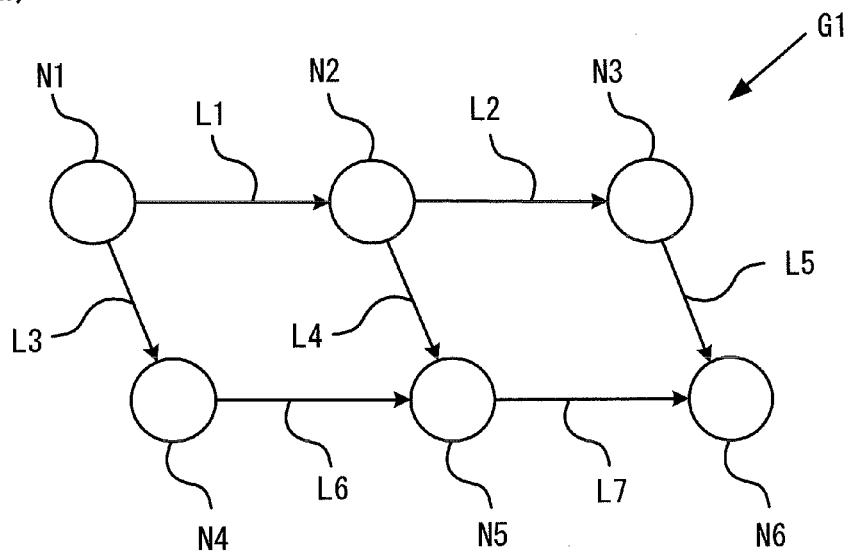
FIG. 2(a) is a figure showing an example of a graph for explanation of nodes and links included in map data.
FIG. 2(b) is a figure showing an example of map data in this first embodiment of the present invention.

FIG. 2 is a pair of figures for explanation of the nodes and the links. In FIG. 2a, a directed graph G1 is shown that contains six nodes N1~N6 and seven links L1~L7. And FIG. 2(b) is a figure showing an example of link data for these links L1~L7.

In the FIG. 2(b) example, a start node ID, an end node ID, and a link cost are shown for each of the links in FIG. 2(a). For example, the link L1 has the node N1 as start point and the node N2 as end point. And the link cost of the link L1 is set to 20 Wh. This link cost mean that, when the electric automobile or the like travels along the road that corresponds to the link L1, the amount of consumption of the charge of the battery of the electric automobile or the like is just 20 Wh. And the negative value of "−20 Wh" is set for the link cost of the link L6. This means that, when the electric automobile or the like travels along the road that corresponds to the link L6, an amount of just 20 Wh of charge is regenerated into the battery of the electric automobile or the like. A directed graph such as the graph of FIG. 2 in which weightings, i.e. so called link costs, are set is called a "weighted directed graph".

In the road map that is specified by this weighted directed graph G1, a route is specified as a series of connected links that are passed in series. The total of the link costs of all the links included in a route is termed the "route cost". For example, in the weighted directed graph of FIG. 2, in the case of the route from the node N1 to the node N6 that passes in order along the link L1, the link L2, and the link L5, the route cost is 40 Wh. Furthermore, another route cost of the route from the node N1 to the node N6 that passes in order along the link L3, the link L6, and the link L7 is 30 Wh. The route between two nodes for which the route cost is minimum is termed the "minimum route". For example, in the example of FIG. 2, the minimum route from the node N1 to the node N6 is the route that passes in order along the link L3, the link L6, and the link L7.

The display monitor 12 may, for example, be a liquid crystal monitor, and displays road maps, routes searched by route search processing, and so on upon its screen, according to control by the control unit 10. The speaker 13 outputs predetermined audio according to control by the control unit 10. The GPS reception unit 14 receives GPS signals transmitted from GPS satellites and transmits them to the control unit 10. And, based upon the GPS signals received from the GPS reception unit 14, the control unit 10 is able to calculate the current position of the vehicle to which this route search device 1 is mounted.

The input device 15 may be built with switches of various types, an operation panel, a touch panel that is integrated with the display monitor 12, or the like. By using this input device 15, the user is able to set a departure point and/or a destination point and to operate the route search device 1. And, during route search processing, the control unit 10 searches for a route from the departure point set via the input device 15 to the destination point set via the input device 15.

The route search processing executed by the control unit 10 will now be explained. The control unit 10 searches for a route from the node corresponding to the departure point to the node corresponding to the destination point by Dijkstra's method. In the following, the node corresponding to the departure point will be termed the "departure node", and the node corresponding to the destination point will be termed the "destination node".

Dijkstra's method is an algorithm that calculates the minimum route from the departure node for a weighted graph in which the link costs are all non negative values. It is per se known that, if Dijkstra's method is applied to a weighted graph in which some links having negative link cost are present, then the route that is calculated is not necessarily the minimum route. The weighted directed graph shown in FIG. 2 is an example of a graph for which the minimum route cannot be searched by Dijkstra's method. For example, if Dijkstra's method is executed with the node N1 of FIG. 2 being set as the departure node and the node N6 being set as the destination node, then the calculation results in the route that passes in order along the link L1, the link L2, and the link L5, and this is not desirable. As previously described, the minimum such route in FIG. 2 is in fact the route that passes in order along the link L3, the link L6, and the link L6.

In the map data stored in the storage unit 11, negative link costs are set for links over which regeneration of battery power takes place. Due to this, in some cases it is not possible to calculate the minimum route with Dijkstra's method by simply using the weighted directed graph for the entire road map based upon the map data stored in the storage unit 11. Thus, based upon the weighted directed graph based upon the map data, the control unit 10 of this route search device 1 generates a weighted directed graph for route searching in which negative link costs are not included. In the following, this weighted directed graph for route searching will be termed the "graph for route searching". Moreover, in the following, the weighted directed graph based upon the map data will be termed the "original map graph".

In this process for generation of the route searching graph based upon the original map graph, first, a partial graph that includes the departure node and the destination node is extracted from the original map graph. For example, the nodes and links that are included in a road map area having an elliptical shape whose focal points are the departure point and the destination point may be extracted from the map data, and may be taken as the partial graph. And the control unit 10 generates duplicates of this partial graph that has been extracted, thus generating a layered graph structure. In the following, such a graph structure in which duplicates of a partial graph are layered over one another will be termed a "layered type graph".

Figure 3:
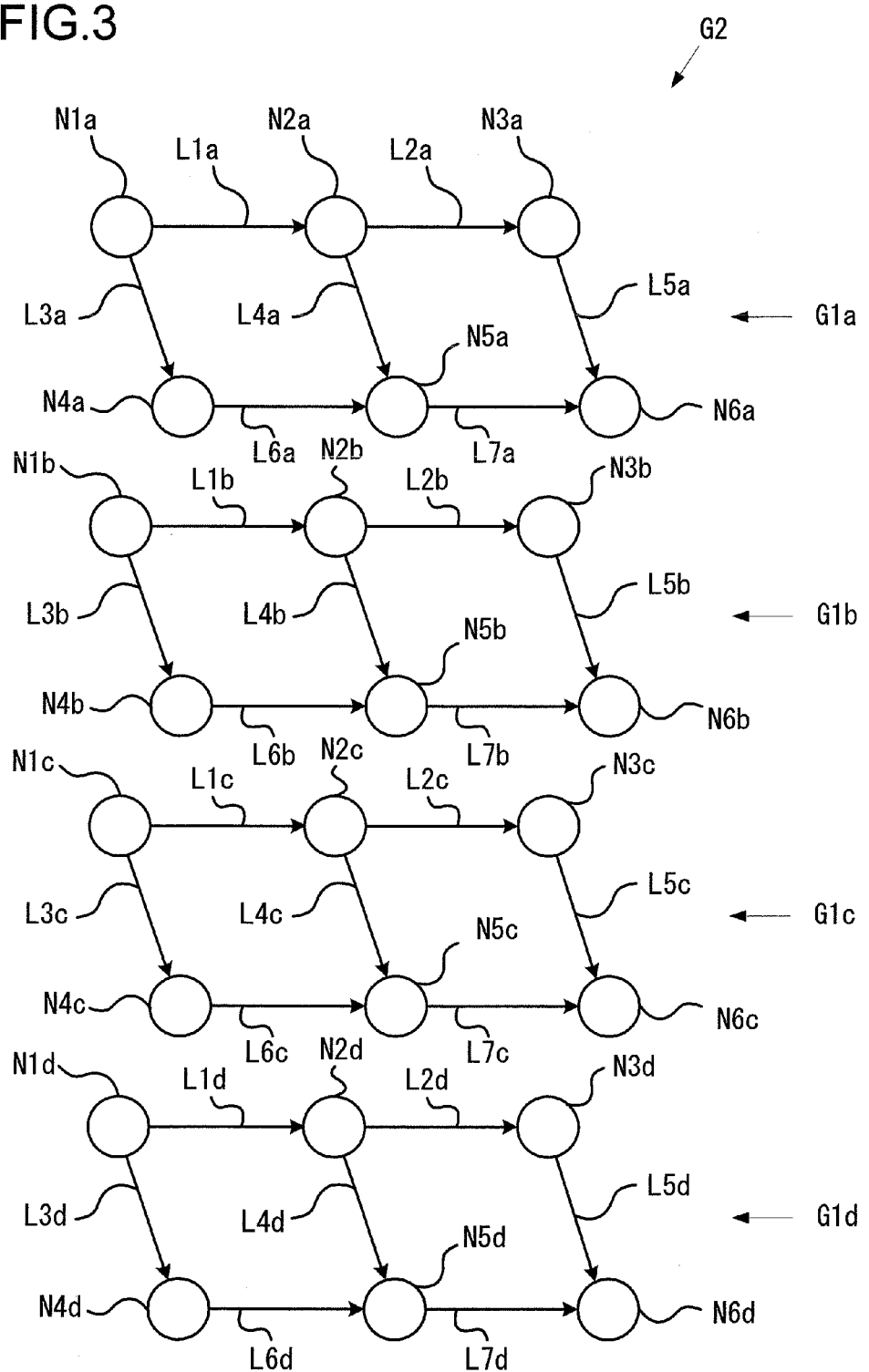
FIG. 3 is an example of a layered type graph that is generated based upon map data.

FIG. 3 is an example of a layered type graph that is generated based upon a partial graph of the original map graph. In the example of FIG. 3, the partial graph of the original map graph is the weighted directed graph G1 shown in FIG. 2. And, in FIG. 3, a layered type graph G2 is shown containing four graphs G1a through G1d that are duplicated from the weighted directed graph G1. The nodes N1a~N1d of FIG. 3 are duplicates of the node N1 of the weighted directed graph G1. In a similar manner, the nodes N2a~N2d are duplicates of the node N2 of the weighted directed graph G1. And the nodes N3a~N3d, the nodes N4a~N4d, the nodes N5a~N5d, and the nodes N6a~N6d are respectively duplicates of the node N3, the node N4, the node N5, and the node N6 of the weighted directed graph G1. Moreover, the links L1a~L1d are duplicates of the link L1 of the weighted directed graph G1. In a similar manner, the links L2a~L2d are duplicates of the link L2 of the weighted directed graph G1. Furthermore, in a similar manner, the links L3a~L3d, the links L4a~L4d, the links L5a~L5d, the links L6a~L6d, and the links L7a~L7d are respectively duplicates of the link L3, the link L4, the link L5, the link L6, and the link L7 of the weighted directed graph G1. In the following a graph that duplicates a partial graph of the original map graph, like the graphs G1a through G1d, will be termed a "duplicate graph".

The number of duplicate graphs to be included in a layered type graph is calculated based upon the node data and the link data included in the partial graph of the original map graph. First, for the nodes included in the partial graph of the original map graph, the control unit 10 searches the elevation value information in the node data, and extracts the maximum value h1 and the minimum value h2 thereof. Next, the control unit 10 extracts the links having negative link cost from among the links included in the partial graph of the original map graph. And, for the negative link costs of the links that have thus been extracted, the control unit 10 calculates the greatest common divisor x of their absolute values. This greatest common divisor x is a non negative rational number. The greatest common divisor x may be calculated according to an algorithm by which the per se known Euclidean algorithm is extended to rational numbers. In the case of the weighted directed graph of FIG. 2, the value of the greatest common divisor x is "10". The control unit 10 calculates the number s of duplicate graphs to be included in the layered type graph by substituting the maximum value h1 and the minimum value h2 of the elevation value information extracted from the node data, and the greatest common divisor x, into Equation (1) given below. It should be understood that the regeneration efficiency A and the gravitational acceleration g in Equation (1) are constants that are determined in advance. The vehicle mass m is stored in the storage unit 11.

[Equation 1]

$s$=regeneration efficiency $A$ [Wh/J]×vehicle mass $m$ [kg]×gravitational acceleration $g$ [m/s$^2$]×(elevation value information maximum value $h1$−elevation value information minimum value $h2$ [m])/ greatest common divisor×[Wh]     (1)

A predetermined layer number is allocated to each of the duplicate graphs. And the control unit 10 generates a graph for route searching by adding links between the layers (i.e. between the duplicate graphs) based upon their layer numbers and upon the link costs of the links included in the layered type graph. In the following, these links that are added between the layers will be termed "links between layers". It should be understood that numerical values from 1 to s are allocated successively for the layer numbers, with lower layers being denoted by larger numerical values. In the example of FIG. 3 it will be supposed that the calculation has yielded s=4, so that the numbers 1, 2, 3, and 4 are assigned to each of the duplicate graphs G1a~G1d respectively.

There are two types of links between layers that are added to the layered type graph in order to generate the graph for route searching. The links between layers of the first type are ones that replace links having negative link cost that are included in the layered type graph.

Figure 4:
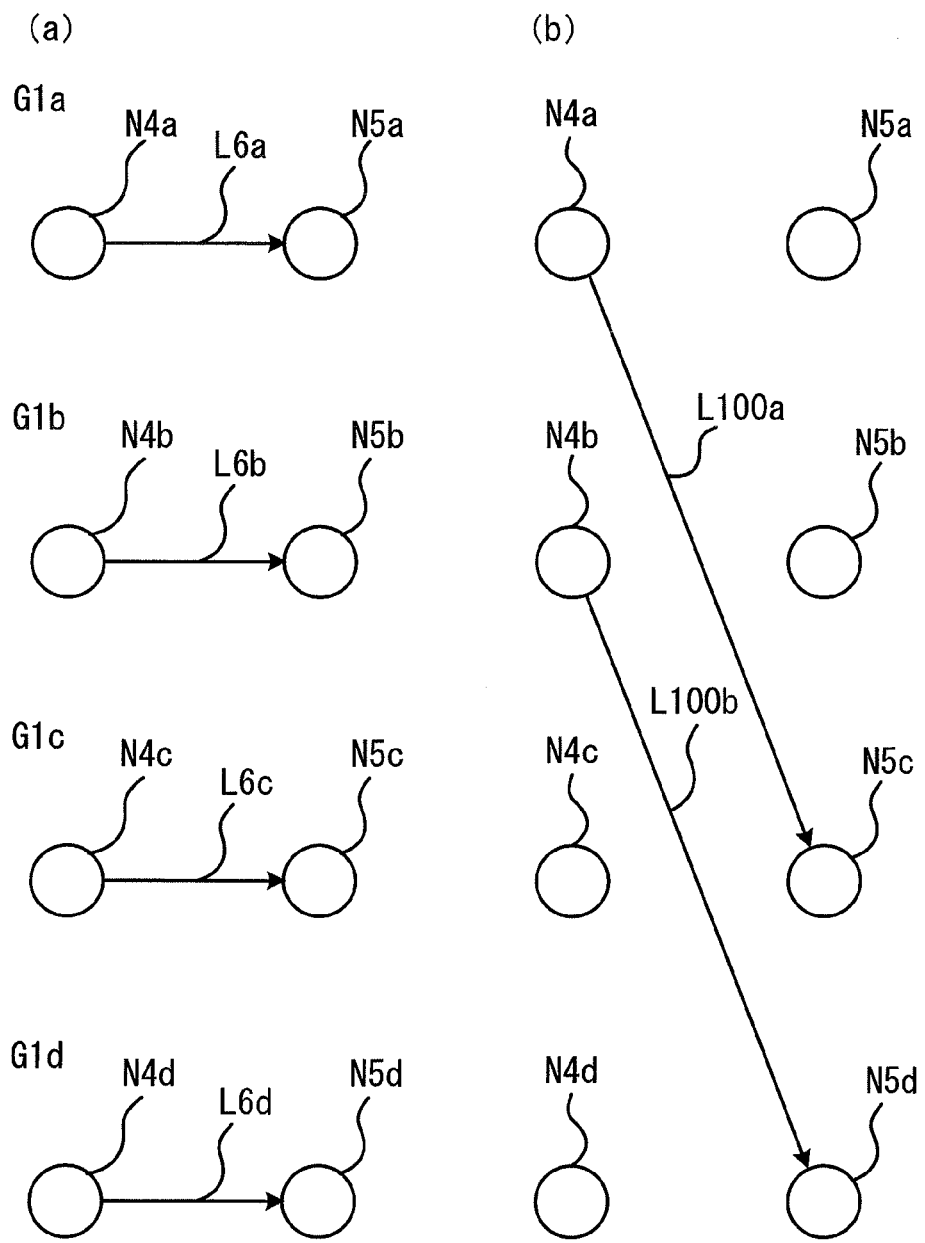
FIGS. 4(a) and 4(b) are figures for explanation of rules for adding links between layers, in this first embodiment of the present invention.

FIG. 4 is a figure for explanation of such first links between layers. FIG. 4(a) is a figure showing only the links L6a~L6d in the layered type graph in FIG. 3 and the nodes at their two ends. The links L6a~L6d have negative link cost y. For the first links between layers, this negative link cost y is divided by the greatest common divisor x described above. In the example of FIG. 4(a), since x=10 [Wh] and y=−20 [Wh], here y/x=−2. And, based upon this result for y/x, the links having negative link cost are replaced by first links between layers according to the following [Rule #1].

[Rule #1]

A link having negative link cost y whose start point is the node Np of the duplicate graph Gj of layer number j and whose end point is the node Nq of the duplicate graph Gj of layer number j, is replaced with a first link between layers having zero link cost whose start point is the node Np of the duplicate graph Gj of layer number j and whose end point is the node Nq of the duplicate graph Gk of layer number k=j−(y/x). However, if no graph corresponding to such a duplicate graph Gk is present within the layered type graph, then it is deleted.

FIG. 4(b) shows the situation when the above described [Rule #1] has been applied to the links L6a~L6d of FIG. 4(a). The link L6a has a negative link cost of −20 [Wh], its start point is the node N4a of the duplicate graph G1a of layer number 1, and its end point is the node N5a of the duplicate graph G1a of layer number 1. The layer number k for the link L6a is k=1−(−2)=3. Since the layer number 3 is the duplicate graph G1c, the link L6a is replaced by a first link between layers L100a having zero link cost, whose start point is the node N4a of the duplicate graph G1a of layer number 1, and whose end point is the node N5a of the duplicate graph G1c of layer number 3. In a similar manner, the link L6b is replaced by a first link between layers L100b. And the links L6c and L6d are deleted, since no duplicate graph exists having layer number 5 or greater.

Then, according to [Rule #2] below, second links between layers are added between destination nodes of duplicate graphs whose layer numbers are adjacent.

[Rule #2]

A second link between layers is added, having the greatest common divisor x as its link cost, having the destination node Nd of the duplicate graph Gi of layer number i as its start point, and having the destination node Nd of the duplicate graph Gj of layer number j=i+1 as its end point. However, if no graph corresponding to the duplicate graph Gj is present within the layered type graph, then no link is added.

For example, if the destination node is the node N6 of FIG. 2, then a second link between layers having link cost of 10 is added, for which the destination node N6a of the duplicate graph G1a of layer number 1 in the layered graph of FIG. 3 is taken as the start point, and the destination node N6b of the destination node of the duplicate graph G1b of layer number 2 is taken as the end point. Moreover, a second link between layers having link cost of 10 is added, for which the node N6b is taken as the start point and the node N6c is taken as the end point. In a similar manner, a second link between layers having link cost of 10 is also added, for which the node N6c is taken as the start point and the node N6d is taken as the end point. However, no second link between layers having the node N6d as start point is added, since no duplicate graph of layer number 5 is present.

Figure 5:
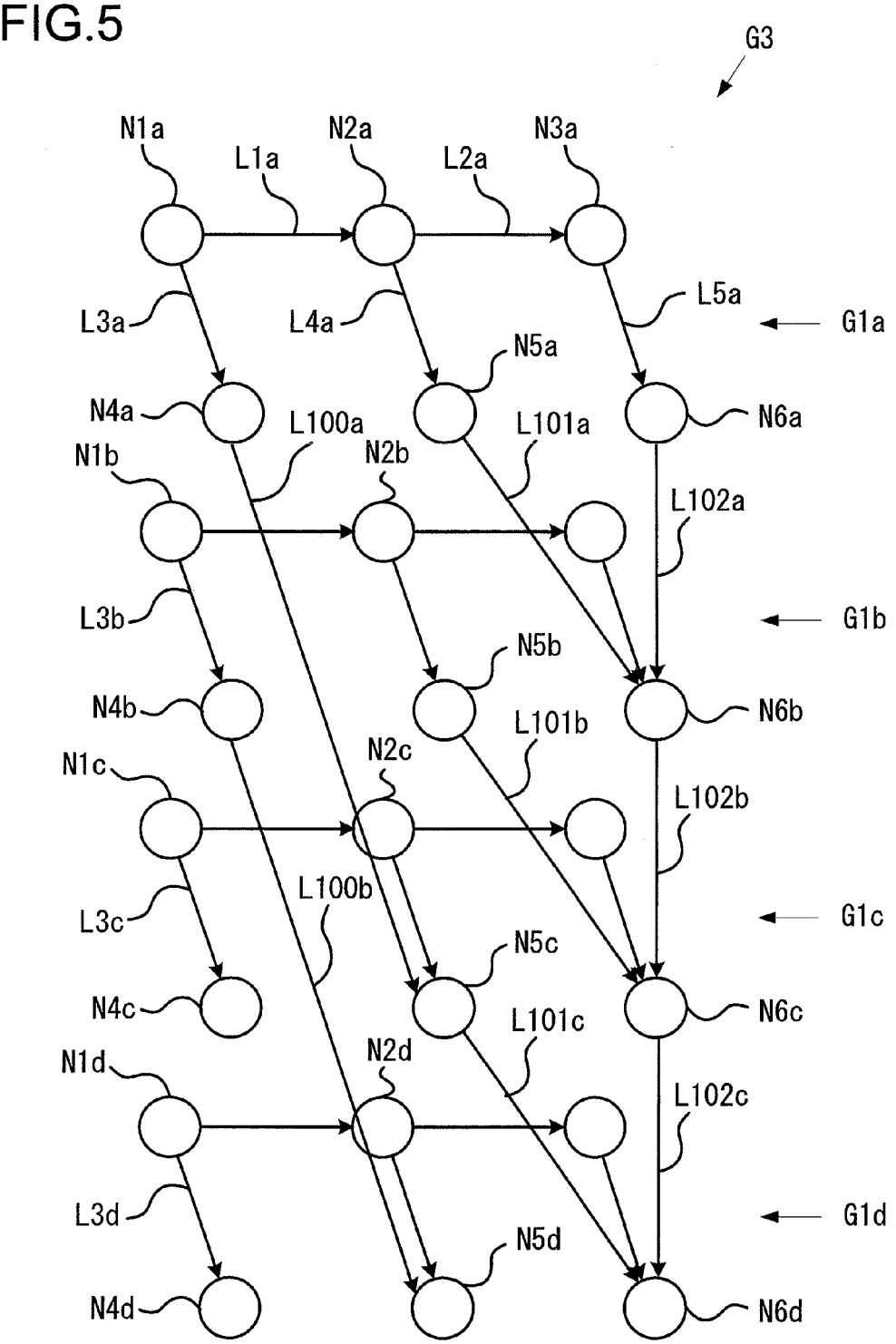
FIG. 5 is an example of a graph for route searching, in the first embodiment of the present invention.

FIG. 5 shows the graph G3 for route searching that has been generated by adding links between layers to the layered type graph G2 of FIG. 3 according to [Rule#1] and [Rule#2]. In FIG. 5, the links L6a, L6b, L7a, L7b, and L7c have been respectively replaced by the first links between layers L100a, L100b, L101a, L101b, and L101c according to [Rule#1]. Moreover, the second links between layers L102a, L102b, and L102c have been added according to [Rule#2].

Having generated the graph for route searching, the control unit 10 calculates, by Dijkstra's method, the route from the node that, among the duplicates of the departure node, is on the highest layer, to the node that, among the duplicates of the destination node, is on the lowest layer. For example, in the case of FIG. 5, it calculates the route from the node N1a to the node N6d.

In this route searching using the graph for route searching, "passing along a link on the route that has negative link cost y" is replaced by "avoiding y/x second links between layers whose link cost is x by passing along a first link between layers for which the link cost is zero", in other words by the layer difference y/x. For example, the route in FIG. 2 that passes in order along the link L1, the link L2, and the link L5 becomes the route in FIG. 5 that passes in order along the link L1a, the link L2a, the link L5a, the second link between layers L102a, the second link between layers L102b, and the second link between layers L102c. The route cost of this route becomes 70 Wh. Moreover, the route in FIG. 2 that passes in order along the link L3, the link L6, and the link L7 becomes the route in FIG. 5 that passes in order along the link L3, the first link between layers L100a, and the first link between layers L101c. The route cost of this route becomes 60 Wh.

It should be understood that, as previously described, the actual route cost of the route that passes in order along the link L1, the link L2, and the link L5 is 40 Wh, and the actual route cost of the route that passes in order along the link L3, the link L6, and the link L7 is 30 Wh. And, if the graph for route searching of FIG. 5 is used, then these route costs are both increased by 30 Wh (thus becoming 70 Wh and 60 Wh respectively). The difference between the costs of these routes is equal to the total value of the costs of the links of the second links between layers L102a~L102c present in FIG. 5. Thus the difference between the route cost when the graph for route searching is used, and the actual route cost, becomes equal to the total of the costs of the second links between layers that have been added.

Figure 6:
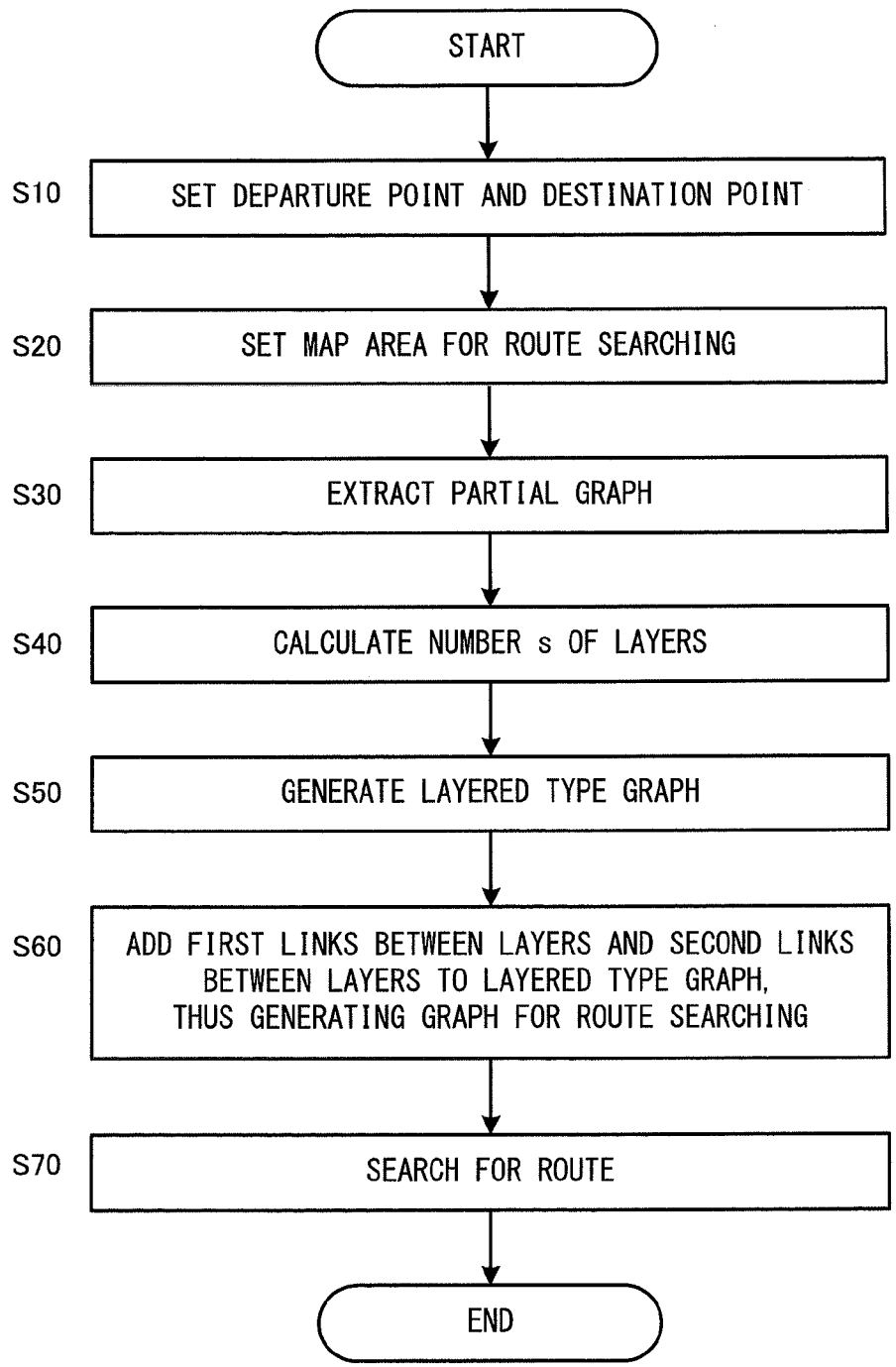
FIG. 6 is an example of a flow chart related to route search processing by this route search device according to the first embodiment of the present invention.

FIG. 6 is a flow chart related to route search processing for searching the route whose route cost is minimum using the graph for route searching shown in FIG. 5 as a virtual road network. First, in a step S10, a departure point and a destination point are set upon the road map. For example, the departure point may be taken as being the current position of the electric automobile or the like. Moreover, for the destination point, a desired ground point may be selected by the user via the input device 15 from the road map that is being displayed upon the display monitor 12.

Next, in a step S20, the control unit 10 sets upon the road map a map area including the departure point and the destination point that have been set upon the road map. For example, it may set a road map area upon the road map of a predetermined size and having an elliptical shape, and with the departure point and the destination point as focal points. Then in a step S30 the control unit 10 extracts, from the map data stored in the storage unit 11, the node data for the nodes for which the node position information is in the range of this road map area of elliptical shape, and also extracts the link data for the links between those nodes that have been extracted. By doing this, it is possible to extract from the map data a partial graph of the original map graph as parent graph.

Next, in a step S40, based upon Equation (1), the control unit 10 calculates the number s of duplicate graphs to be included in the layered type graph, in other words the number s of layers of the graph for route searching. And in a step S50 the control unit 10 generates just the layer number s of duplicates of the partial graph calculated in the step S40, and thereby generates the layered type graph. Then in a step S60 the control unit generates the graph for route searching by applying [Rule #1] and [Rule #2] to the layered type graph generated in the step S50. Finally in a step S70, by Dijkstra's method, the control unit calculates a route from the departure node that is on the highest level of this graph for route searching generated in the step S60 to the destination node that is on the lowest layer of this graph for route searching.

By generating a graph for route searching based upon the map data in this manner, and by employing route searching according to Dijkstra's method, it is possible to search the correct recommended route in consideration of both the amount of battery electrical power consumption and also the amount of regenerated power.

Second Embodiment

Figure 7:
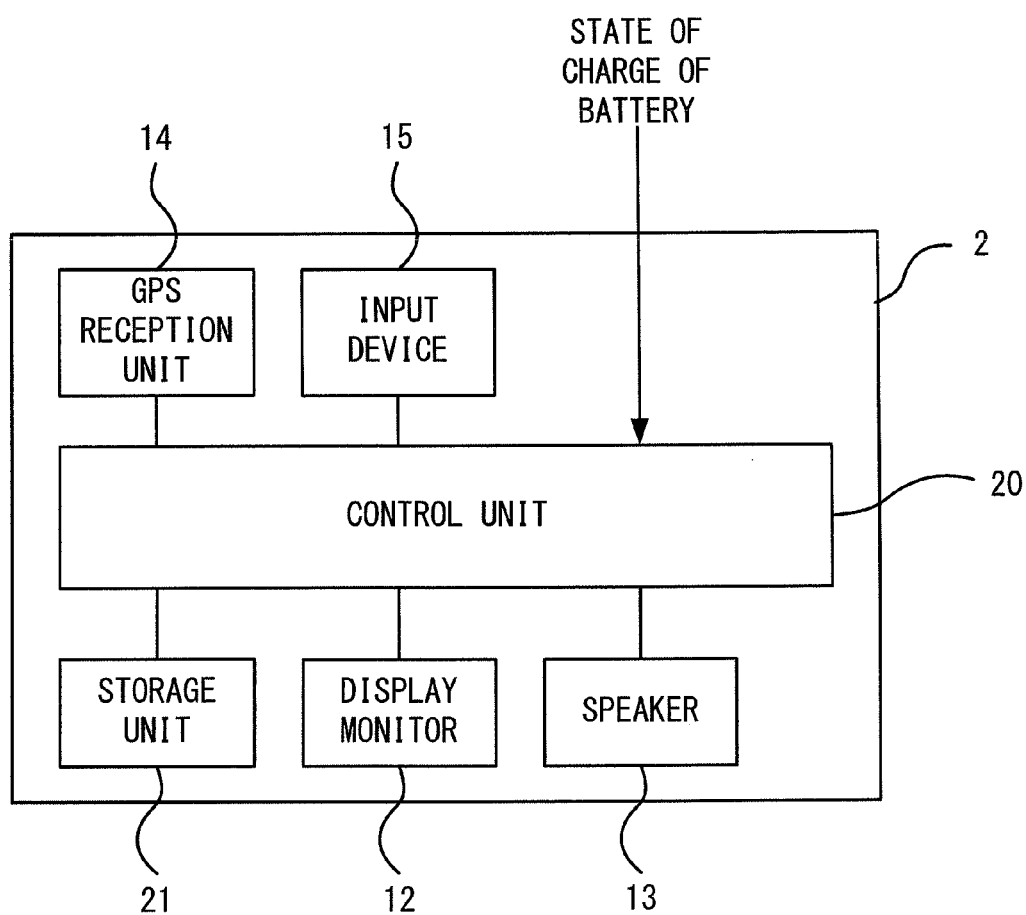
FIG. 7 is a block diagram showing an example of the structure of a route search device according to a second embodiment of the present invention.

A second embodiment of the present invention will now be explained. FIG. 7 is a block diagram showing an example of the structure of a route search device according to the second embodiment of the present invention. The route search device 2 of FIG. 7 is a navigation device, and is mounted to a hybrid electric automobile (HEV) that is propelled by employing both energy of a fuel such as gasoline or the like and also electrical energy supplied from a battery, in combination. The route search device 2 contains a control unit 20, a storage unit 21, a display monitor 12, a speaker 13, a GPS reception unit 14, and an input device 15. Explanation will be omitted of structural elements that are the same as ones of the first embodiment.

The control unit 20 contains a microprocessor, peripheral circuitry of various types, RAM, ROM and so on. The control unit 20 controls the various structures of the route search device 2 so as to perform route search processing and so on. In other words, the control unit 20 executes a program stored in its ROM while using its RAM as a working area, and thereby performs control of the route search device 2. From the HEV, the control unit 20 is able to acquire information related to the state of charge of the battery.

The storage unit 21 is a non volatile storage member such as a hard disk or a flash memory or the like. Map data and the mass of the HEV to which the route search device 2 is mounted are stored in the storage unit 21. This map data includes node data and link data used by the control unit 20 in route search processing. The node data is the same as in the first embodiment. However, in the link data, the detail of the information specifying the link costs is different from the case of the first embodiment.

In this second embodiment, the link cost is specified by the amount of consumption of fuel such as gasoline or the like, and the amount of consumption of battery power. Among these link costs, a negative value for the amount of consumption of battery power means that the battery receives regenerated power.

The route search processing performed by the control unit 20 in this second embodiment will now be described. In this second embodiment, based upon the map data, the control unit 20 generates a second graph for route searching that is different from the graph for route searching of the first embodiment.

Figure 8:
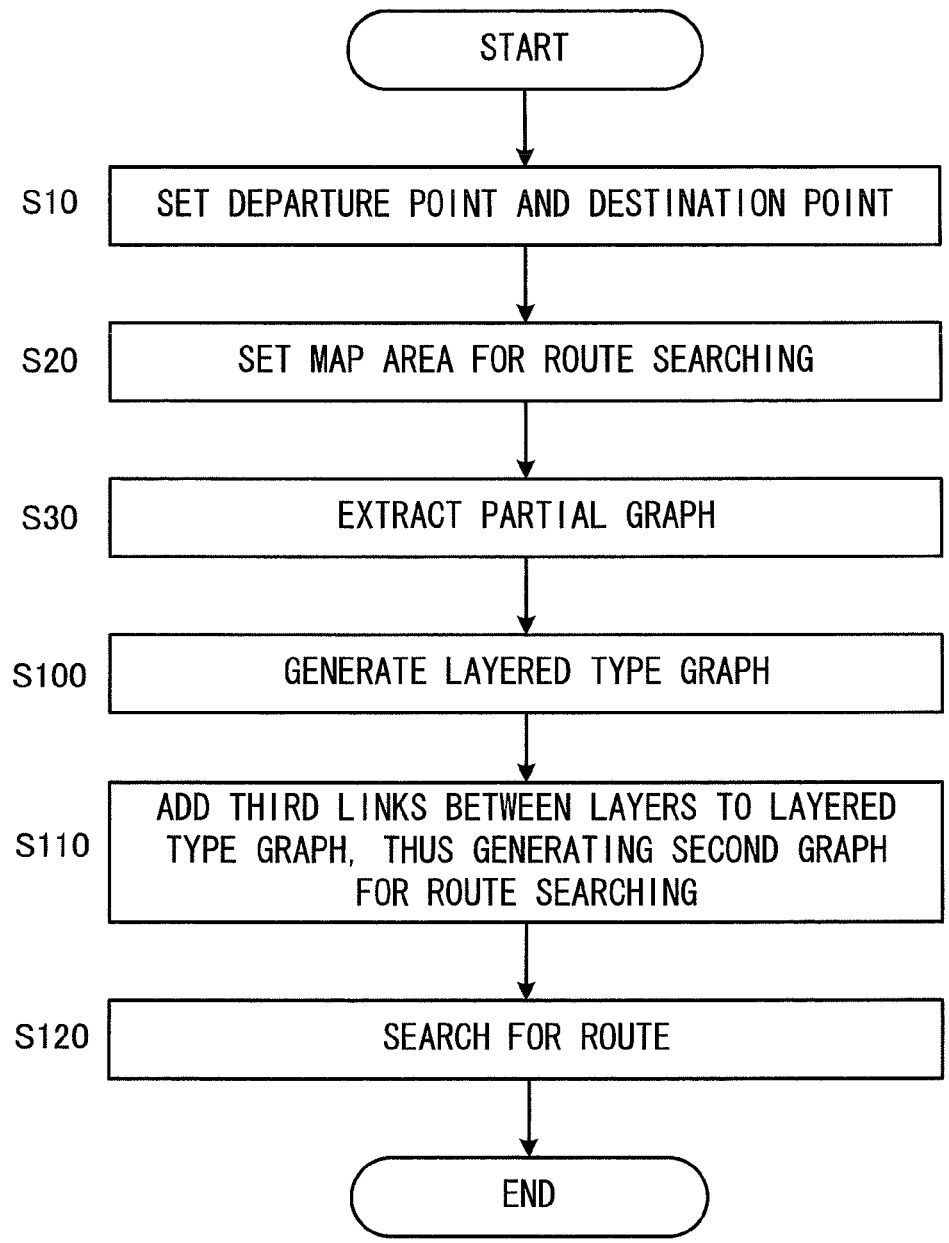
FIG. 8 is an example of a flow chart related to second route search processing by this route search device according to the second embodiment of the present invention.

FIG. 8 is an example of a flow chart related to route search processing for the control unit 20 to search the route whose route cost is minimum using the second graph for route searching as the virtual road network, based upon the map data stored in the storage unit 21. From the beginning to the step S30, the processing for generating the second graph for route searching shown in FIG. 8 is the same as the processing shown in FIG. 6.

Then, in a step S100, the control unit 20 generates a predetermined number s2 of duplicates of the partial graph of the original map graph, and thus generates a layered type graph. This predetermined number s2 is a constant integer multiple of F/gcd(F,x2). Here, F [Wh] is the remaining battery amount when the battery of the HEV is fully charged. x2 [Wh] is the greatest common divisor of the absolute values of all of the link costs related to amounts of electrical power consumption that are included in the map data. And gcd(F,x2) is the greatest common divisor of F and x2.

Then, in a step S110, the control unit 20 adds third links between layers based upon [Rule #3] described below to the layered type graph generated in the step S100, and thus generates a second graph for route searching. These third links between layers specify changes of the charge state of the battery of the HEV, and each layer of the layered type graph of this second embodiment specifies a state of charge of the battery. The layer having layer number i ($1 \leq i \leq s2$) corresponds to a state in which the remaining battery amount of the battery of the HEV is F×(s2−i)/(s2−1) [Wh]. And then, in a step S120, the control unit 20 calculates a route from the departure point to the destination point using this second graph for route searching generated in the step S110, using Dijkstra's method. The method for setting the departure node and the destination node will be described hereinafter.

[Rule #3]

A third link between layers Ls (described below) is added based upon a link L (described below) stored in the storage unit 21. However, if no duplicate graph corresponding to the layer number k is present within the layered type graph, and j≠1 and also j≠s2, then the value of k is set to a value that is one of 1 and s2 close to k. Moreover, if no duplicate graph corresponding to the layer number k is present within the layered type graph, and j=1 or j=s2, then no link between layers is added.

"The link L"
link cost related to amount of electrical power consumption: y1;
link cost related to fuel consumption amount: y2;
start point: node Np of the duplicate graph of layer number j;
end point: node Nq of the duplicate graph of layer number j;
"The link Ls"
link cost related to amount of electrical power consumption: zero;
link cost related to fuel consumption amount: y2;
start point: node Np of the duplicate graph of layer number j;
end point: node Nq of the duplicate graph of layer number k=j+y1/(F/(s2−1)).

Figure 9:
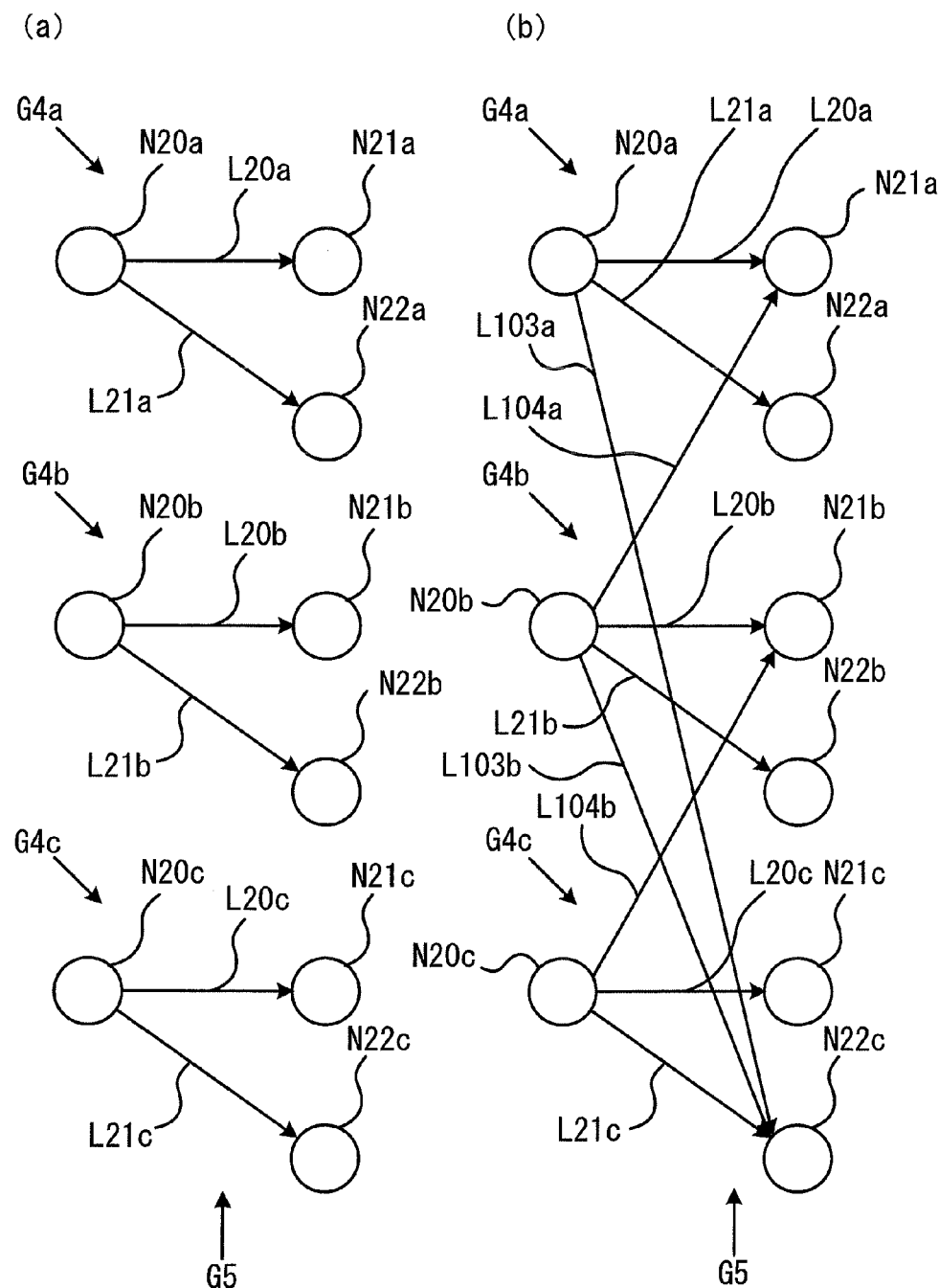
FIGS. 9(a) and 9(b) are figures for explanation of a rule for adding links between layers, in this second embodiment of the present invention.

FIG. 9 is a figure for explanation of [Rule #3]. In FIG. 9(a), a layered type graph G5 is shown that has s2=3 and that is made up from a duplicate graph G4a, a duplicate graph G4b, and a duplicate graph G4c. The graph G4a contains a node N20a, a node N21a, a node N22a, a link L20a, and a link L21a. In a similar manner, the duplicate graph G4b contains a node N20b, a node N21b, a node N22b, a link L20b, and a link L21b. Likewise, the duplicate graph G4c contains a node N20c, a node N21c, a node N22c, a link L20c, and a link L21c. The links L20a~L20c have negative link costs related to the corresponding amounts of electrical power consumption (for example, −2 kWh). And the links L21a~L21c have positive link costs related to the corresponding amounts of electrical power consumption (for example, +4 kWh). It will be supposed that, when the battery of the HEV is fully charged, the remaining battery amount F is 4 kWh. The duplicate graph G4a corresponds to layer number 1, and corresponds to the state when the remaining battery amount of the battery of the HEV is 4 kWh. And the duplicate graph G4b corresponds to layer number 2, and corresponds to the state when the remaining battery amount of the battery of the HEV is 2 kWh. Moreover, the duplicate graph G4c corresponds to layer number 3, and corresponds to the state when the remaining battery amount of the battery of the HEV is zero.

The link between layers L103a of FIG. 9(b) is a third link between layers that is added based upon the link L21a according to [Rule #3]. The link L21a has a link cost related to the amount of electrical power consumption of y=+4 kWh, and its start point is the node N20a of the duplicate graph G4a of layer number 1, while its end point is the node N22a of the duplicate graph G4a of layer number 1. This third link between layers L103a has its start point at the node N20a of the duplicate graph G4a of layer number 1, and its end point at the node N22c of the duplicate graph G4c of layer number k=3=1+4000/(4000/(3−1)). And the link cost related to the amount of electrical power consumption of this third link between layers L103a is set to zero.

Moreover, the link between layers L103b of FIG. 9(b) is a third link between layers that is added based upon the link L21b according to [Rule #3]. The link L21b has a link cost related to the amount of electrical power consumption of y=+4 kWh, and its start point is the node N20b of the duplicate graph G4b of layer number 2, while its end point is the node N22b of the duplicate graph G4b of layer number 1. On this third link between layers L103b, the start point is the node N20a of the duplicate graph G4b of layer number 1. Moreover, since no duplicate graph whose layer number is k=4=2+4000/(4000/(3−1)) is present within the graph G5, accordingly its end point becomes the node N22c of the duplicate graph G4c of layer k=s2=3. And the link cost related to the amount of electrical power consumption of this third link between layers L103a is set to zero.

For the link L21c, no link between layers is added, since no duplicate graph whose layer number is k=5=3+4000/(4000/(3−1)) is present within the graph G5, and also j=s2.

Furthermore, the link between layers L104a is a link between layers that is added based upon the link L20b according to [Rule #3]. The link L20b has a link cost related to the amount of electrical power consumption of y=−2 kWh, and its start point is the node N20b of the duplicate graph G4b of layer number 2, while its end point is the node N21b of the duplicate graph G4b of layer number 1. On this link between layers L104a, the start point is the node N20b of the duplicate graph G4b of layer number 2, while the end point is the node N21a of the duplicate graph G4a of layer number k=1=2+(−2000)/(4000/(3−1)). And the link cost of this link between layers L104a is set to zero. And the link cost of this link between layers L104a is set to zero. In a similar manner to the link between layers L104a, the link between layers L104b is a link between layers that is added based upon the link L20c according to [Rule #3]. Since no duplicate graph of layer number less than or equal to 1 is present in the layered type graph G5, and the original layer number j is 1, accordingly no link between layers is added based upon the link L20a.

In this second embodiment, after having generated the second graph for route searching, the control unit 20 performs route searching by Dijkstra's method. At this time, route searching is performed while giving consideration both to link costs related to the amounts of consumption of electrical power and also to link costs related to the amounts of consumption of fuel.

Among the nodes that are positioned most closely to the current position of the HEV, when the state of charge of the battery of the HEV at the start time point of route search processing is f [Wh], the node that is on the layer of layer number n=f/Fx(1−s2)+s2 is selected as the departure point. Moreover, it would also be possible to arrange for the destination node to be a destination node on any layer, or to end the route searching when a route to a destination node upon any layer is confirmed; and it would also be possible to arrange for the destination node to be set by the user to be on a predetermined layer.

It would also be possible to arrange, in the case of determination of a destination node for the user to be allowed to select a predetermined layer and to be allowed to complete route searching, further to add fourth links between layers and fifth links between layers according to the following [Rule #4].

[Rule #4]

A fourth link between layers is added, with the link cost related to the amount of consumption of electrical power and the link cost related to the amount of fuel consumption both being zero, with the destination node Nd of the duplicate graph Gi of the layer number i being taken as the start point, and with the destination node Nd of the duplicate graph Gj of the layer number j=i+1 being taken as the end point. However, if no graph corresponding to the duplicate graph Gj is present in the layered type graph, then no such fourth link is added.

And a fifth link between layers is added, with the link cost related to the amount of consumption of electrical power and the link cost related to the amount of fuel consumption both being zero, with the destination node Nd of the duplicate graph Gi of the layer number i being taken as the start point, and with the destination node Nd of the duplicate graph Gk of the layer number k=i−1 being taken as the end point. However, if no graph corresponding to the duplicate graph Gk is present in the layered type graph, then no such fifth link is added.

With the route search processing according to this second embodiment, route searching is performed while calculating route costs of two types, one based upon the amount of consumption of electrical power and the other based upon the amount of consumption of fuel Links that are included within the original partial graph, in other words the links L20a~L20c and the links L21a~L21c are used for the calculation of the route cost related to the fuel consumption amount, while they are not used for the calculation of the route cost related to the amount of electrical power consumption. In other words, this means that the hybrid electric automobile travels over the roads that correspond to those links while consuming fuel. The third link between layers L103a, the third link between layers L103b, and the third links between layers L104a~L104c are used for the calculation of the route cost related to the amount of electrical power consumption, while they are not used for the calculation of the route cost related to the fuel consumption amount. Since, among the link costs related to the amount of consumption of electrical power, those that are related to the route cost are set to zero, and are replaced by shifts between layers, accordingly it is possible to search the correct recommended route by employing Dijkstra's method.

Third Embodiment

The route search device according to the third embodiment of the present invention has the same structure as the route search device 1 according to the first embodiment shown in FIG. 1. However, with this route search device according to the third embodiment, the link data in the map data stored in the storage unit 11 is different from the case of the first embodiment.

In this third embodiment, the link data does not include any link costs. In the third embodiment, the control unit 10 estimates the amount of power lost or regenerated by the electric automobile or the like traveling upon the road that corresponds to a link, and the control unit 10 calculates a link cost based upon this estimated power amount. The amount of power estimated by the control unit 10 becomes a non negative value in the case of a link upon which power is lost, and becomes a non positive value in the case of a link upon which power is regenerated. The control unit 10 generates the graph for route searching using the link costs that have thus been calculated.

Figure 10:
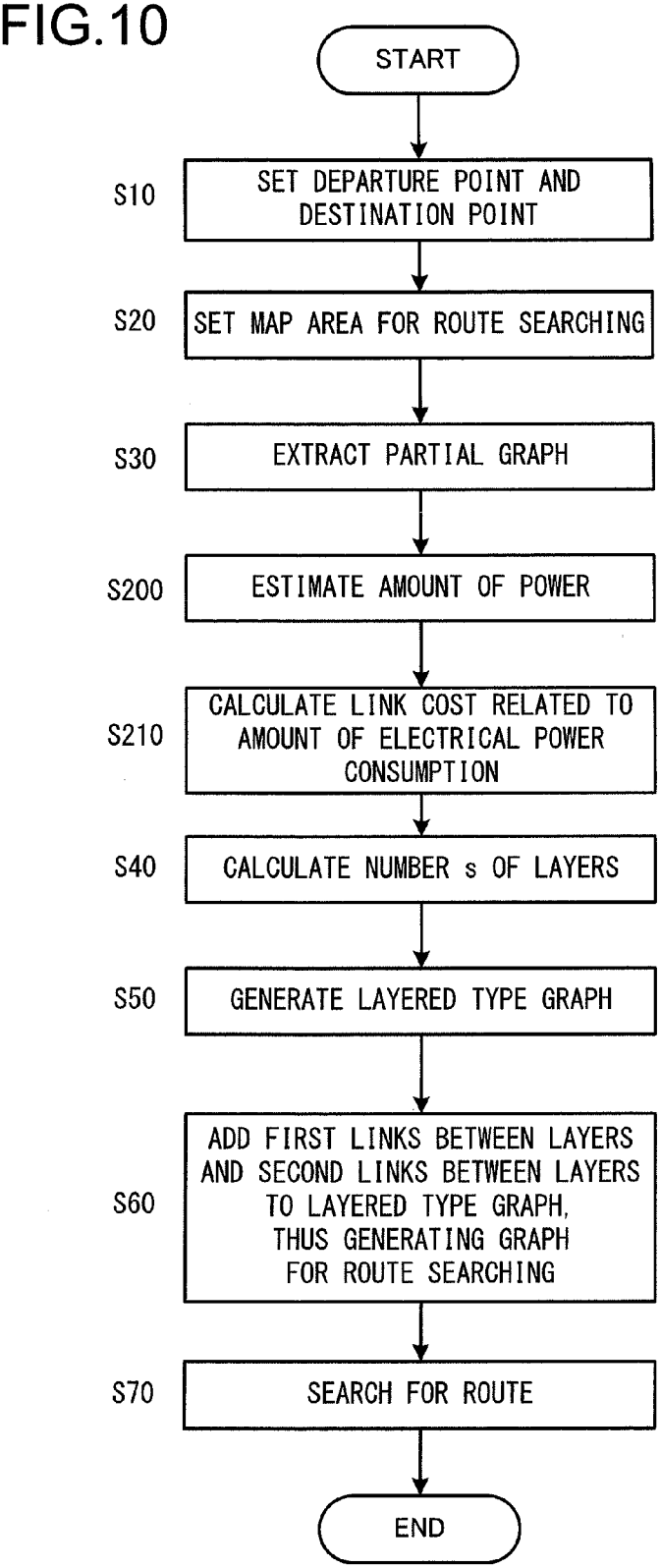
FIG. 10 is an example of a flow chart related to route search processing by a route search device according to a third embodiment of the present invention.

FIG. 10 is a flow chart related to route searching in which the control unit 10 searches a route using the graph for route searching. From the beginning to the step S30, the processing exemplified in FIG. 10 is the same as the processing shown in FIG. 6.

In this third embodiment, after having extracted the partial graphs of the original map graph as their parent graph from the map data in the step S30, the control unit 10 starts the processing of a step S200. In this step S200, the control unit 10 estimates the amount of power lost or regenerated by the electric automobile or the like traveling along each link included in the partial graphs that were extracted in the step S30.

For example, the control unit 10 may estimate the amounts of power as follows. First, using Equation (2), the control unit 10 calculates the amount of change of energy $E_k$ for each link included in the partial graph extracted in the step S30. For a link for which the amount of change of energy $E_k$ has a positive value, the control unit 10 estimates the amount of power that is lost, while, for a link for which the amount of change of energy $E_k$ has a negative value, it estimates the amount of power that is regenerated. It should be understood that $V_1$, $H_1$, and $D_1$ for each link are the average vehicle speed, elevation, and link distance, while $V_2$ and $H_2$ are the average vehicle speed and elevation for the next link after that link. And $\lambda_1$, $\lambda_2$, $\lambda_3$, and $\lambda_4$ are respectively the acceleration resistance coefficient, the gradient resistance, the road surface resistance coefficient, and the coefficient of air resistance.

[Equation 2]

$$E_1 = \frac{\lambda_1}{2} \times (V_2^2 - V_1^2) + \lambda_2 \times (H_2 - H_1) + \lambda_3 \times D_1 + \lambda_4 \times V_1^2 \times D_1 \qquad (2)$$

The control unit 10 may, for example, estimate the amount of power lost by multiplying the amount of change of energy $E_1$ by a predetermined power conversion coefficient C. And the control unit 10 may, for example, estimate the amount of power regenerated by multiplying the amount of change of energy $E_1$ by the predetermined power conversion coefficient C, by a regenerating braking to friction braking allocation ratio α, and by a regeneration coefficient R.

In the step S210, the control unit 10 calculates the link costs related to the amounts of electrical power consumption for the links included in the partial graph extracted in the step S30, using the amounts of power that were estimated for those links in the step S200. For example, it may perform these calculations by multiplying the amounts of power estimated in the step S200 by weight coefficients that change according to the widths of the roads and the angles of curving of the roads denoted by those links.

After the control unit 10 has calculated the link costs for the links included in the partial graph extracted in the step S30, it is able to generate a graph for route searching in a similar manner to that of the first embodiment by executing the processing of the steps S40 through S60 using those link costs. By using route searching according to Dijkstra's method on the graph for route searching, it is possible to search for the correct recommended route in consideration of both the amount of consumption of the electrical power of the battery and also the amount of regenerated power of the electrical power of the battery.

Fourth Embodiment

The route search device according to the fourth embodiment of the present invention has the same structure as the route search device 1 according to the second embodiment shown in FIG. 7. However, with this route search device according to the fourth embodiment, the link data in the map data stored in the storage unit 21 is different from the case of the second embodiment.

In a similar manner to the case with the third embodiment, in this fourth embodiment, the link data does not include any link costs. It should be understood that, in a similar manner to the case with the second embodiment, the link costs in the fourth embodiment include both link costs related to the amounts of fuel consumption and also link costs related to the amounts of electrical power consumption.

In this fourth embodiment, the control unit 20 estimates the amounts of power lost or regenerated each time the hybrid electric automobile travels upon the roads corresponding to the links by a similar method to that employed in the third embodiment. The amounts of power estimated by the control unit have non negative values for links upon which power is lost, while having non positive values for links upon which power is regenerated. And the control unit 20 calculates the link costs related to the amounts of electrical power consumption using these estimated values for the amounts of power.

Moreover, the control unit 20 estimates the fuel consumption amounts Q when the hybrid electric automobile is traveling upon the roads that correspond to the links, and calculates the link costs related to amounts of fuel consumed using these fuel consumption amounts Q. For example, using the basic consumption amount $F_{BASE}$ of the engine, the link travel times T for the links, the dynamic energy equivalent weight $E_2$, the vehicle mass W, the characteristic topographic amounts $M_B$, $M_C$, and $M_D$ of the links, the proportions $P_A$ of accelerating travel within the links, the air resistance losses $E_{AIR}$, and the acceleration losses $E_{ACC}$ due to the kinetic energy accompanying acceleration, for example, the control unit 20 may estimate the fuel consumption amounts according to the following Equation (3).

[Equation (3)]

$$Q = F \times T + E_2 \times [W \times \{M_B \times P_A + M_C \times (1-P_A) + M_D\} + E_{AIR} + E_{ACC}] \quad (3)$$

Figure 11:
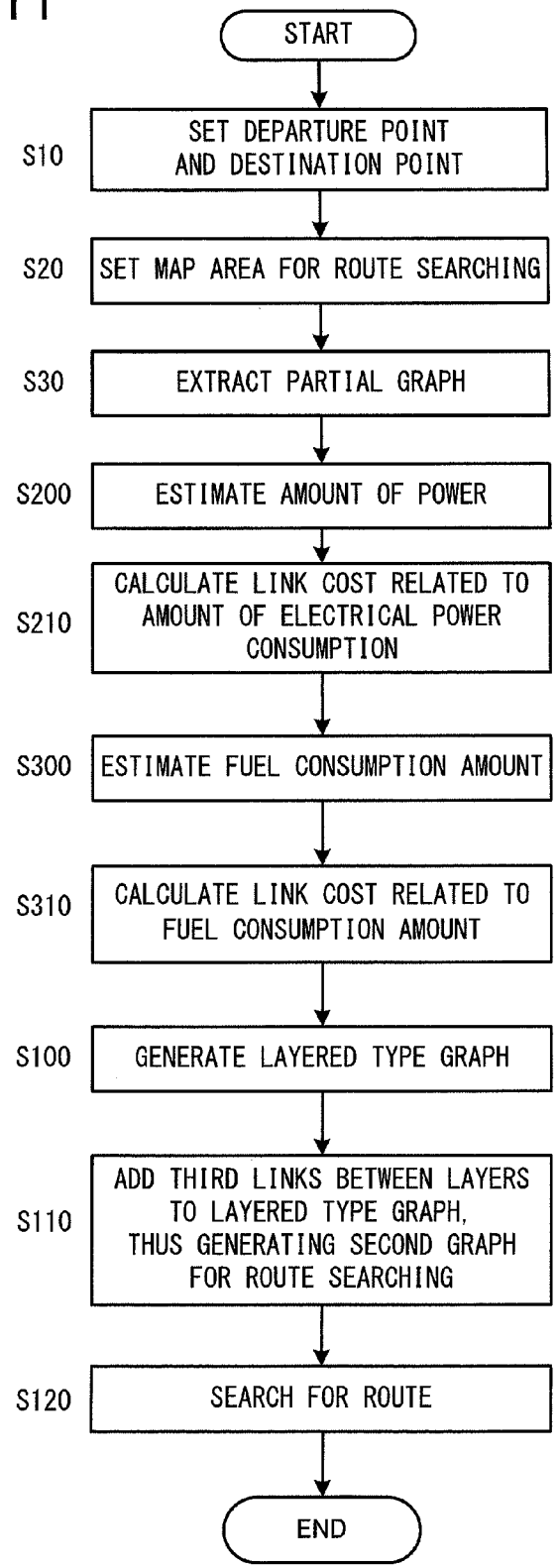
FIG. 11 is an example of a flow chart related to route search processing by a route search device according to a fourth embodiment of the present invention.

FIG. 11 is a flow chart related to route search processing in which the control unit 20 searches a route using the second graph for route searching. In the flow chart shown by way of example in FIG. 11, similar reference symbols are appended to steps that are the same as in FIGS. 8 and 10, and explanation thereof will be omitted. And, in a step S300, the control unit 20 estimates the fuel consumption amounts Q by using Equation (3). Then in a step S310 the control unit calculates the link cost by using the fuel consumption amounts estimated in the step S300.

According to the embodiments described above, the following beneficial operational effects are obtained.

With the route search device 1 according to the first embodiment of the present invention, the control unit 10 performs the processing shown in FIG. 6 by executing the program stored in the storage unit 11. The control unit 10 extracts a partial graph related to a map area in which the departure point and the destination point are included from the map data stored in the storage unit 11 (the step S30 of FIG. 6). Then the control unit generates duplicate graphs that are duplicates of the partial graph, and generates the layered type graph (in the step S50). And the control unit 10 adds first links between layers and second links between layers to the layered type graph, and thus generates the graph for route searching (in the step S60). Finally the control unit searches for a route using the graph for route searching (in the step S70). The first links between layers are links in which the end nodes of links in the layered type graph that have negative link cost are changed into the corresponding nodes included in partial graphs of other layers, and that have non negative link costs. And the second links between layers have non negative link costs, and connect between destination point nodes of duplicate graphs that have neighboring layer numbers. Due to this, it is possible to perform route searching in consideration both of the amount of battery electrical power that is consumed and also of the amount of battery electrical power that is regenerated.

With the route search device 2 according to the second embodiment of the present invention, the control unit 20 performs the processing shown in FIG. 8 by executing the program stored in the storage unit 21. The control unit 20 extracts a partial graph related to a map area in which the departure point and the destination point are included from the map data stored in the storage unit 21 (the step S30 of FIG. 8). Then the control unit 20 generates the duplicate graphs that are duplicates of the partial graph, and thus generates the layered type graph (in the step S100). And the control unit 20 adds the third links between layers to the layered type graph, and thus generates the second graph for route searching (in the step S110). Finally, the control unit 20 searches for a route using this second graph for route searching (in the step S120). The third links between layers are links in which the end node of each link has been changed to the corresponding end point node in a partial graph in another of the layers. Due to this, it is possible to perform route searching while giving consideration both to the amount of consumption of the electrical power of the battery and also to the amount of regenerated power of the battery. Furthermore, in the second embodiment, it is possible, not only to make it possible to provide a route upon which the energy consumption to reach the destination point is minimized, but also to search for a route upon which the links to be travelled using the engine and the links to be travelled using the motor have been selected in an appropriate manner.

With the route search device according to the third embodiment of the present invention, the control unit 10 performs the processing shown in FIG. 10 by executing the program stored in the storage unit 11. The control unit 10 extracts a partial graph related to a map area in which the departure point and the destination point are included from the map data stored in the storage unit 11 (the step S30 of FIG. 10). Then the control unit 10 calculates the link cost for each of the links included in this partial graph (in the steps S200 and S210). And the control unit 10 generates duplicate graphs that are duplicates of the partial graph, and thus generates the layered type graph (in the step S50). Then the control unit 10 adds the first links between layers and the second links between layers to this layered type graph, and thus generates the graph for route searching (in the step S60). Finally the control unit 10 performs route searching by using this graph for route searching (in the step S70). The first links between layers are links in which the end nodes of links in the layered type graph that have negative link costs have been replaced by the corresponding nodes included in partial graphs on others of the layers, and that have non negative link costs. Moreover, the second links between layers also have non negative link costs, and connect between destination nodes of the duplicate graphs whose layer numbers are adjacent. Due to this, it is possible to perform route searching while giving consideration both to the amount of consumption of electrical power of the battery and also to the amount of regenerated power of electrical power of the battery.

With the route search device according to the fourth embodiment of the present invention, the control unit 20 performs the processing shown in FIG. 11 by executing the program stored in the storage unit 21. The control unit 20 extracts a partial graph related to a map area in which the departure point and the destination point are included from the map data stored in the storage unit 21 (the step S30 of FIG. 11). Then, for each link included in the partial graph, the control unit 20 calculates the link cost related to consumption of electrical power and the link cost related to fuel consumption (in the steps S200, S210, S300, and S310). And the control unit 20 generates the duplicate graphs that are duplicates of the partial graph, and thus generates the layered type graph (in the step S100). Then the control unit 20 generates the second graph for route searching by adding the third links between layers to the layered type graph (in the step S110). Finally, the control unit 20 searches for a route by using this second graph for route searching (in the step S120). The third links between layers are links in which the end nodes of the links have been changed to the corresponding end point nodes in partial graphs on other layers. Due to this, it is possible to perform route searching while giving consideration both to the amount of consumption of electrical power of the battery and also to the amount of regenerated power of electrical power of the battery. Moreover, in the fourth embodiment, it is possible, not only to make it possible to provide a route along which the energy consumption to reach the destination point is minimum, but also to search for a route in which links to be travelled using the engine and links to be travelled using the motor are included in an appropriate manner.

Variants of the embodiments explained above may be implemented as follows.

In the embodiments described above, it was arranged for the departure point to be the current position of the electric automobile or the like. However, it would also be acceptable to arrange for the departure point to be a point that is inputted by the user via the input device 15 as well, in a similar manner to the case with the destination point.

Figure 12:
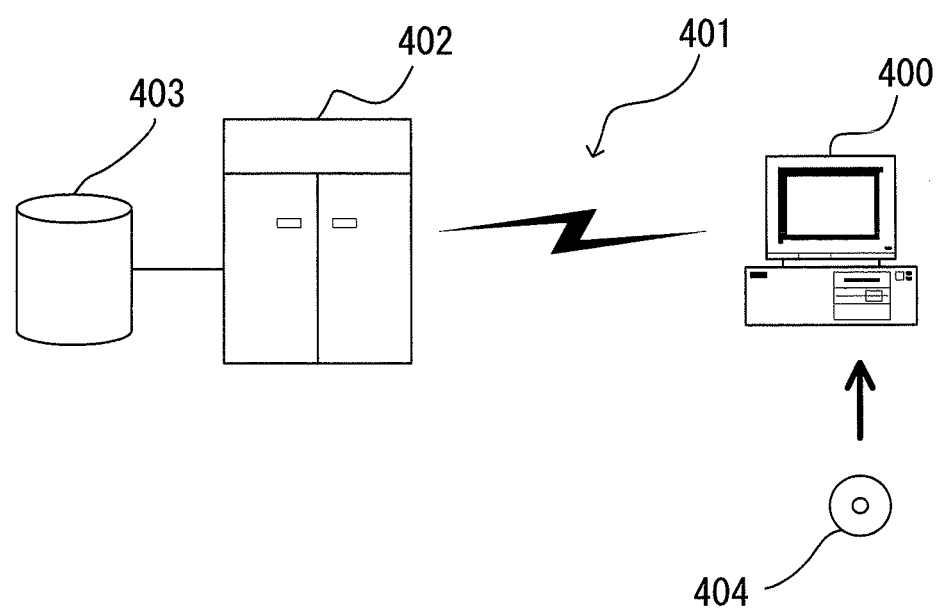
FIG. 12 is a figure for explanation of the overall structure of a device for providing a program product.

While it was arranged for the route search device 1 to be a navigation device, it could also be a device of some other type, rather than a navigation device. It could be a computer that is provided with a control unit that is capable of executing route search processing, for example a personal computer such as a notebook PC or the like or an information processing device such as a portable terminal or the like. The same holds for the route search device 2. Moreover, if the present invention is applied to an information processing device such as a personal computer or the like, then the program related to the control described above may be supplied via a recording medium such as a CD-ROM or the like, or via a data signal such as the internet or the like. FIG. 12 is a figure showing this situation. A personal computer 400 receives supply of the program via a CD-ROM 404. Moreover, the personal computer 400 has a function of connecting to a communication circuit 401. A computer 402 is a server computer that supplies the program described above, and that stores the program upon a recording medium such as a hard disk 403 or the like. The communication circuit 401 is a communication circuit such as the internet or personal computer communication or the like, or a dedicated communication circuit or the like. The computer 402 reads out the program using the hard disk 403, and transmits the program to the personal computer 400 via the communication circuit 401. In other words, the program is transmitted via the communication circuit 401 as a data signal via a carrier wave. In this manner, it is possible to supply the program as a computer readable program product in various different formats, such as upon a recording medium or via a data signal (i.e. a carrier wave) or the like.

It would also be acceptable, in the step S60 of FIG. 6 or FIG. 10, to arrange for the CPU 10 further to add sixth links between layers to the layered type graph using [Rule #5] described below. [Rule #5] is a rule by which links having positive link cost that are included in the layered type graph are replaced by sixth links between layers. By thus using the sixth links between layers and the first links between layers simultaneously, it is possible, in some case, to reduce the number of layers that are needed in the layered type graph.

[Rule #5]

A link that has positive link cost y3 and whose start point is the node Np of the duplicate graph Gj of layer number j and whose end point is the node Nq of the duplicate graph Gj of layer number j, is replaced by a sixth link between layers whose start point is the node Np of the duplicate graph Gj of layer number j and whose end point is the node Nq of the duplicate graph Gk2 of layer number of layer number k2=j+(y3−mod(y3,x))/x. mod(y3,x) is the remainder when the link cost y3 is divided by the greatest common divisor x. The link cost of this sixth link between layers may be set to this remainder mod(y3,x). It should be understood that, if no graph corresponding to the duplicate graph Gk2 is present in the layered type graph, then no such sixth link is added.

In [Rule #1], it was arranged for the CPU 10 to calculate the layer number k in which the end node Nq of the first link between layers was present as being k=j−(y/x), using the greatest common divisor x. However, it would also be possible to arrange for the CPU 10 to calculate this layer number k as being k=j−(y−mod(y,x3))/x3, using a predetermined value x3 (for example, x3=10) instead of the greatest common divisor x. If this predetermined value x3 is used instead of the greatest common divisor x, then it is desirable for the link cost of the first links between layers to be made equal to mod(y,x3). Moreover, if this predetermined value x3 is used instead of the greatest common divisor x, then it is desirable for the greatest common divisor x to be changed to the predetermined value x3 in the calculation of the number of layers s according to Equation (1) as well. Furthermore, it is also desirable to change it to the predetermined value x3 in the link costs of the second links between layers as well. It should be understood that, when the greatest common divisor x is less than or equal to the predetermined value x3, it would also be possible to arrange for the CPU 10 to determine the layer number k, the number of layers s, and the link costs of the second links between layers using the predetermined value x3, instead of the greatest common divisor x. When the greatest common divisor x is less than or equal to the predetermined value, it is possible to keep down the size of the graph for route searching by calculating the number of layers s by using the predetermined value x3. Due to this, it is possible to prevent the usage ratio of RAM from becoming excessively great due to route searching.

It would also be acceptable, in the step S110 of FIG. 8 and FIG. 11, to arrange for the CPU 20 further to add seventh links between layers to the layered type graph using [Rule #6] described below. By thus adding these seventh links between layers to the layered type graph, it becomes possible to search for a route with which the remaining amount in the battery of the hybrid electric automobile at the time point of arrival at the destination point becomes greater than or equal to a predetermined remaining amount $W_{rem}$.

[Rule #6]

To a layer number i for which $i \leq s2 - W_{rem}/(F/(s2-1))$, a seventh link between layers is added for which the link cost related to the amount of electrical power consumption is zero and the link cost related to the amount of fuel consumption is $F/(s2-1)$, whose start point is the destination node Nd of the duplicate graph Gi of layer number i, and whose end point is the destination node Nd of the duplicate graph Gj of layer number j=i-1. However, if no graph corresponding to the duplicate graph Gj is present in the layered type graph, then no such seventh link is added.

While Dijkstra's method was used as the technique for route search processing by both the route search device 1 and the route search device 2, this is not to be considered as being limitative. It would also be acceptable to employ some other per se known calculation technique for route searching.

The various embodiments and variant embodiments explained above have only been shown by way of example, and the present invention is not to be considered as being limited by any of the details thereof, provided that the essential characteristics of the present invention are preserved. Moreover, it would also be acceptable to arrange for the various embodiments and variant embodiments explained above to be executed in combination, provided that the essential characteristics of the present invention are preserved.

The content of the disclosure of the following application, upon which priority is claimed, is hereby incorporated herein by reference:

Japanese Patent Application 2011-227625 (filed on Oct. 17, 2011).

The invention claimed is:

1. A route search method, comprising:
from map data including node data relating to nodes and link data relating to links, extracting nodes and links included in a map area in which a departure point and a destination point are included;
for the links extracted, determining non negative link costs related to energy consumption or non positive link costs related to energy regeneration;
generating a first road network by, for each of the nodes and each of the links extracted, generating a plurality of duplicates thereof;
generating a second road network by adding first additional links and second additional links to the first road network; and
searching for a route from a duplicate of a node corresponding to the departure point to a duplicate of a node corresponding to the destination point, using the link costs determined and the second road network generated;
wherein:
the first additional links are links for which predetermined non negative link costs are set, and in each of which a node of an end point of a duplicate of each of the links generated is changed to a node of an end point of another duplicate of the each of the links; and
the second additional links are links for which predetermined non negative link costs are set, and each of which connects between duplicates of node corresponding to the destination point.

2. A route search method according to claim 1, wherein, energy consumption or energy regeneration is included in the link data for each link as a non negative link cost or a non positive link cost respectively.

3. A route search method according to claim 1, wherein, a plurality of duplicate graphs are generated, each containing the nodes and the links extracted, and the first road network having a plurality of layers is generated using the plurality of duplicate graphs.

4. A route search method according to claim 3, wherein:
the first additional links are links in each of which the end point of the duplicate of the each of the links generated is changed to the end point of the another duplicate of the each of the links belonging to a different layer only by layer number corresponding to the link cost; and
the second additional links are links each of which, among duplicates of the node corresponding to the destination point, connects between duplicates of the node corresponding to the destination point whose layers are one layer apart.

5. A route search method according to claim 3, wherein:
the map data includes elevation value information related to elevation of ground points on the road map; and
total number of layers of the first road network is calculated based upon the elevation value information.

6. A route search method according to claim 1, wherein, when non negative link costs related to electrical power consumption, corresponding to the non negative link costs related to the energy consumption, or non positive link costs related to power regeneration, corresponding to the non positive link costs related to the energy regeneration, are determined, link costs related to fuel consumption are further determined for the links extracted.

7. A route search device, comprising
a control unit that
extracts, from map data including node data relating to nodes and link data relating to links, nodes and links included in a map area in which a departure point and a destination point are included;
determines, for the links extracted, non negative link costs related to energy consumption or non positive link costs related to energy regeneration;
generates a first road network by, for each of the nodes and each of the links extracted, generating a plurality of duplicates thereof;
generates a second road network by adding first additional links and second additional links to the first road network; and
searches for a route from a duplicate of a node corresponding to the departure point to a duplicate of a node corresponding to the destination point, using the link costs determined and the second road network generated;
wherein:
the first additional links are links for which predetermined non negative link costs are set, and in each of which a node of an end point of a duplicate of each of the links generated is changed to a node of an end point of another duplicate of the each of the links; and the second additional links are links for which predetermined non negative link costs are set, and each of which connects between duplicates of node corresponding to the destination point.

8. A route search device according to claim 7, wherein,
energy consumption or energy regeneration is included in the link data for each link as a non negative link cost or non positive link cost respectively.

9. A route search device according to claim 7, wherein,
a plurality of duplicate graphs are generated by the control unit, each containing the nodes and the links extracted, and the first road network having a plurality of layers is generated by the control unit using the plurality of duplicate graphs.

10. A route search device according to claim 9, wherein:
the first additional links are links in each of which the end point of the duplicate of the each of the links generated is changed to the end point of the another duplicate of the each of the links belonging to a different layer only by layer number corresponding to the link cost; and the second additional links are links each of which, among duplicates of the node corresponding to the destination point, connects between duplicates of the node corresponding to the destination point whose layers are one layer apart.

11. A route search device according to claim 9, wherein:
the map data includes elevation value information related to elevation of ground points on the road map; and
total number of layers of the first road network is calculated by the control unit based upon the elevation value information.

12. A route search device according to claim 7, wherein,
when non negative link costs related to electrical power consumption, corresponding to the non negative link costs related to the energy consumption, or non positive link costs related to power regeneration, corresponding to the non positive link costs related to the energy regeneration, are determined by the control unit, link costs related to fuel consumption are further determined by the control unit for the links extracted.

\* \* \* \* \*

UNITED STATES PATENT AND TRADEMARK OFFICE
CERTIFICATE OF CORRECTION

Page 1 of 1

PATENT NO. : 8,965,694 B2
APPLICATION NO. : 14/352249
DATED : February 24, 2015
INVENTOR(S) : Kentaro Daikoku et al.

It is certified that error appears in the above-identified patent and that said Letters Patent is hereby corrected as shown below:

On the Title Page

Item (30) Foreign Application Priority Data, the priority application number is incorrect and should read:

--Oct. 17, 2011  (JP)  2011-0227625--

Signed and Sealed this
Twenty-third Day of June, 2015

Michelle K. Lee
*Director of the United States Patent and Trademark Office*